126. STOVES & FURNACES,
Stoves, Heating,
Liquid or gaseous fuel, Gas.

2 Sheets—Sheet 1.

W. F. SHAW.

Gas Stove.

No. 407. Reissued Oct. 28, 1856.

N. PETERS, Photo-Lithographer, Washington, D. C.

126. STOVES & FURNACES,

Stoves, Heating,

Liquid or gaseous fuel, Gas.

85-

2 Sheets—Sheet 2.

W. F. SHAW.

Gas Stove.

No. 407.

Reissued Oct. 28, 1856.

N. PETERS, Photo-Lithographer, Washington, D. C.

UNITED STATES PATENT OFFICE.

WILLIAM F. SHAW, OF BOSTON, MASSACHUSETTS.

IMPROVED APPARATUS FOR HEATING BY GAS.

Specification forming part of Letters Patent No. 14,325, dated February 26, 1856; Reissue No. 407, dated October 28, 1856.

*To all whom it may concern:*

Be it known that I, WILLIAM F. SHAW, of Boston, in the county of Suffolk and State of Massachusetts, have invented an Improved Apparatus or Contrivance for Heating by Gas; and I do hereby declare that the following is a description of the construction and operation of the same, reference being had to the annexed drawings, making part of this specification, in which—

Figure 4:
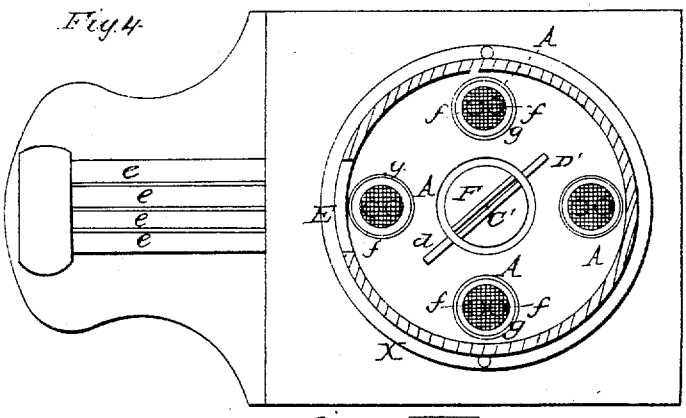
Figure 1:
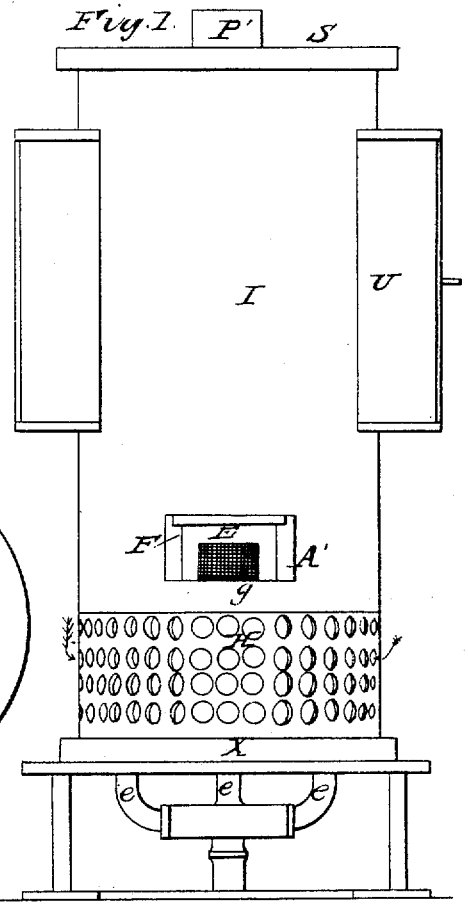
Figure 3:
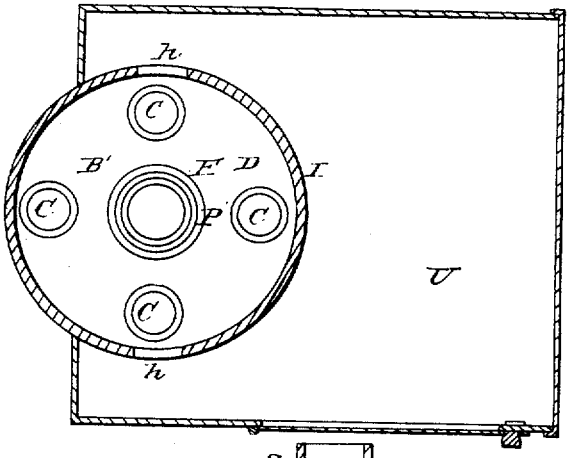
Figure 2:
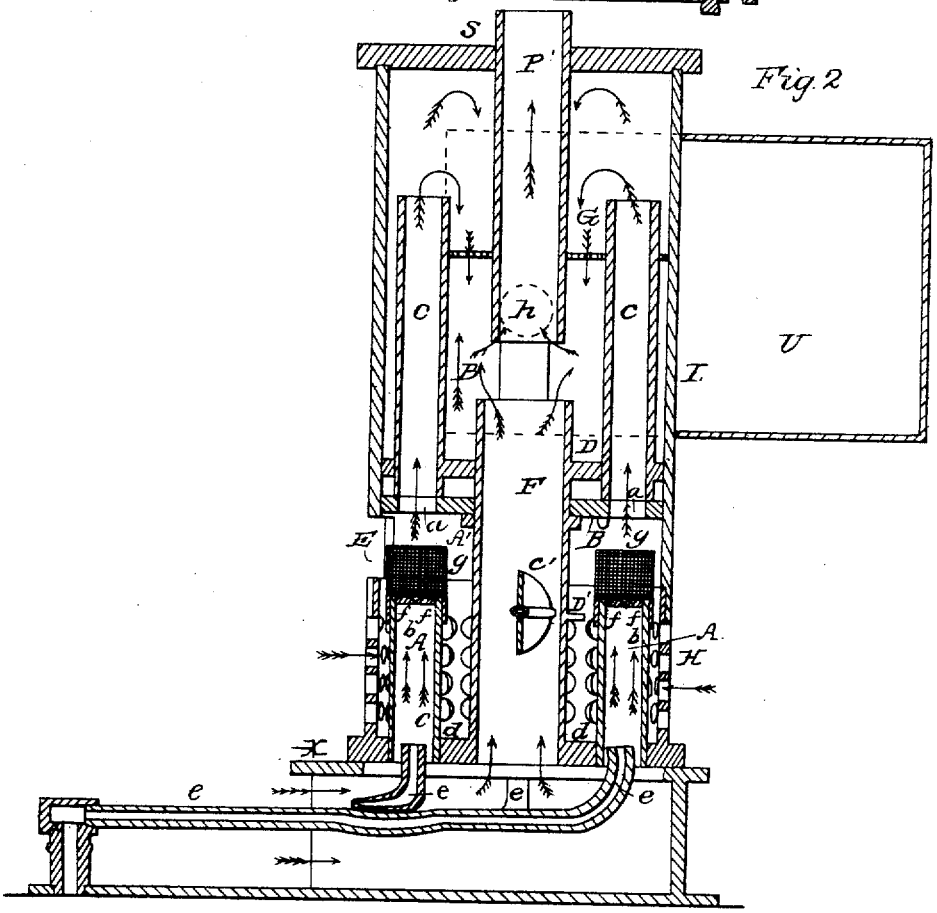

Figure 1 is a front elevation; Fig. 2, a longitudinal and vertical section; and Fig. 3, a horizontal section of the said apparatus, the section last mentioned being taken through the oven. Fig. 4 is a horizontal section of it, and is taken through the chamber containing the burners or disseminators to be hereinafter described.

It is well known that when a mixture of air and gas, or gas from a jet is burning in air, a current is created by which the heat generated is rapidly removed from the point where it is produced, and becomes diffused through the metal or other matter over the surfaces of which it may pass. Heat thus diffused loses the higher temperature of its source, and is not so efficient in heating air as it is when in a more concentrated state. It is one object of my arrangement to prevent dispersion of this kind, and to control the accumulation at one or more points where I wish to use it.

Hitherto the combustion of gas mixed with air or issuing from jets has not been perfectly effected, some of the gas escaping unburned or producing, by combination with oxygen at too low a temperature, aldehyde and formic acid, with the odor of the vapor called "camphic acid." For the purpose of heating in such cases there is a loss of heat only; but when it is desirable to use the hot products of combustion for cooking meats and other food, the odorous products often become absorbed by the cooking food, and an offensive taste is given them, such rendering it necessary to apply heat to them through metal or other media.

My experiments have shown that the most ordinary illuminating-gas may be burned in mixture with air, and from disseminators or contrivances, as hereinafter described, made to impart their heat almost entirely in a given space, where it can be retained by means of non-conductors, or it may be diffused and carried in a current from such space to other points, and for the performance of either cooking or heating operations, or both.

Figure 5:
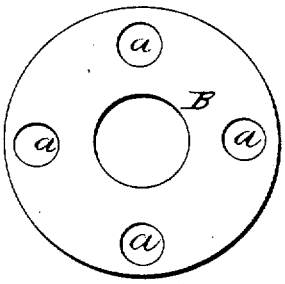

The means by which I effect the above requisites, giving a degree of universality of application to my invention, will be seen by inspection of the parts lettered, in which A A A A (see Figs. 2 and 4) represent four disseminators, from which the gas is burned in a space or chamber, A′, surrounding them after it has passed into them from a main or pipe. Above these desseminators or burners is placed a movable or rotary pierced disk, B, (see Fig. 5, which is a top view of it,) over each of the openings *a a a a*, in which is arranged one of four vertical flue-tubes, C C C C, which receive the heated volatile products of combustion and permit the same to flow upward through them. These flue-tubes are fixed near their lower ends, in another or stationary partition, D, which supports them firmly in position.

The pierced disk B may be so connected with the door of an opening, E, leading through the side of the chamber A′, that on opening the door sufficiently such disk may be caused to revolve so far as to close the communication between the flue-tubes and the chamber A′ around the disseminators. The object of this device or pierced disk B, which I apply only in cases where there are several disseminators, is not only to prevent gas at the moment of its being inflamed from streaming up through one more than another flue-tube, but to cause the gas in all the disseminators to be lighted by the introduction of flame to any one of the disseminators, or into the chamber A′, the disseminators being lighted by explosion of the gas within the chamber A′. On closing the opening into the chamber A′ the lower end of the tubes C C C C should be uncovered. Each disseminator is formed in part of a fine wire-gauze cap or netting, *b*, arranged on the upper end of an air-tube, *c*, elevated on and above the bottom *d* of the chamber A′, and open at its lower end to receive air, and one of a series of conduit-pipes, *e e e e*, for the transmission of inflammable gas into it, (the said tube *e*,) the gas being mixed with the air and the mixture burned on the wire-gauze cap *b*.

The part *b*, instead of being a flat disk, may be formed with one or more convexities, or nipple-shaped elevations, as seen at *ff* in Figs. 2 and 4, such serving, as I have found by experience, to greatly improve the combustion of the gas. These convexities or protuberances of the wire-gauze cause the flame to be spread or diffused and promote mixture of the air and gas where they are burned.

Figure 6:
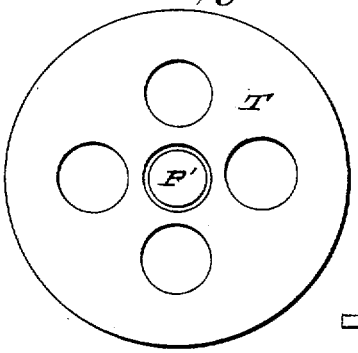

My improvement does not consist in rounding up the entire disk of gauze, or making it meniscus or watch-glass shaped, but in making it with sundry nipple-shaped concavo-convex projections or corrugations, whereby the streams of air and gas, after they have passed through the orifices of projections or corrugations are caused to impinge against one another, their mixture and combination being improved thereby. Each disseminator is surrounded by a wire-gauze chimney, *g*, or with a tube made with an open top and with its sides perforated with many minute orifices and extended above the top of the disseminator and so as to surround the flame of its effluent gas when such gas is inflamed. With such a device, not only are the waste carbonaceous and gaseous matter, which produce a disagreeable smell and escape laterally from the flame, returned by influent currents of air and commingled and consumed, but the disseminator is so exposed as to be capable of being inflamed from above it by flame passed into or through its open top. A tube, F, having a sectional area of bore equal to those of all the tubes of the disseminators is open at both ends, and arranged so as to extend into and supply air to the space or reverberatory chamber B′ containing or surrounding the flue-tubes. It has within it a valve, C′, which may be moved by the rod D′, so as to regulate the amount of air passing up the tube. This tube is an important part of my invention, for without it the gas is liable to recession through the disseminators, the combustion is languid, and a due mixture of air with the gas does not take place in the chamber B′ around the flue-tube. Near the tops of the flue-tubes and extending across the chamber B′ is a grating wire-gauze, pierced diaphragm or partition, G, through which the flue-tubes pass, their ends being a short distance above it. All the internal structure thus described is surrounded by a cylindrical or other form of case in one or more pieces, as seen at H I, the lower part or piece, H, being of pierced metal or its mechanical equivalent, while the upper portion slips easily over and includes the disk and tubes and rises about half its diameter above them. The pierced part of the case rests on the top of a square hollow base, X, in which are the gas-pipes leading the gas to the disseminators, while the front of the square base being open the air for combustion freely enters into the base and passes up the tubes of the disseminators. Covers or domes of different forms are used for closing the cylindrical case above in order to adapt the furnace either to heating the surrounding air or to cooking. Thus a dome or plain cover, S, having an eduction-pipe, P′, passing down through the grating near to the pipe F, is used when the furnace is to serve as a heater, the waste gases being led off by a funnel; but when it is to serve for cooking this cover is replaced by another, T, (see Fig. 6,) having the ordinary openings for receiving boilers or vessels. An oven, U, may also be attached to the case and heated by the products of combustion led into it through one or more openings, *h*, on each side of the case I. The vapors and spent gases may be suffered to escape through one or more holes formed through the bottom of the oven and be conducted off by a pipe leading to a discharge-flue. It will be observed that the outer case, when in position, covers space divided into three parts or chambers, and that the greatest part of the heat produced is accumulated in the upper of these chambers. Following the course of the heated air it will be seen that it cannot escape from the upper chamber without descending through the grating or gauze therein and thus giving out its heat. This important part of my invention is rendered more economical by covering the grating by a layer (one or more inches in thickness) of coarsely-powdered pumice-stone or balls of other non-conducting material through which the gas must pass, thereby heating the upper surface of such and causing it to radiate powerfully while the heat of the gas is, as it were, strained out. If either the interior or exterior of the case be provided with a non-conducting lining, which may be movable, very little heat will be lost by the sides, while the vessels used in cooking are exposed to both radiant and conducted heat. Every trace of gas and vapor is thus burned in mixture with the air from the tube F by being brought into contact with the heated surfaces. Pure carbonic acid and heated vapor entering the oven are admirably fitted for baking or roasting.

When the operations of cooking are to be continued many successive hours, or where economy in the consumption of gas is of prime importance, I place on the grating of the upper or reverberating chamber a proper wire basket or case containing refuse coke or charcoal in bits the size of filberts, which, becoming ignited, will be slowly consumed, adding its heat to that produced by the burning gas. The facility with which I can retain in or lead off heat from this chamber induces me to call the arrangement or device a "universal gas-furnace."

Having thus described my inproved apparatus for heating by gas, what I claim therein is—

1. The combination and arrangement, substantially as described, of air and gas burners or distributers, chambers A′ and B′, and their flue and air supply conductors F C C, the whole being made to operate essentially as specified.

2. In combination with the gas-burner, the perforated or wire-gauze tube *g*, operating as specified.

In testimony whereof I have hereunto set my signature this 23d day of June, A. D. 1856.

WM. F. SHAW.

Witnesses:
R. H. EDDY,
F. P. HALE, Jr.